June 12, 1934. G. J. OLNEY 1,962,668
STRING BEAN CLEANER
Filed Sept. 24, 1931 2 Sheets-Sheet 1

INVENTOR
George J. Olney
BY Martin & Rendell
ATTORNEYS

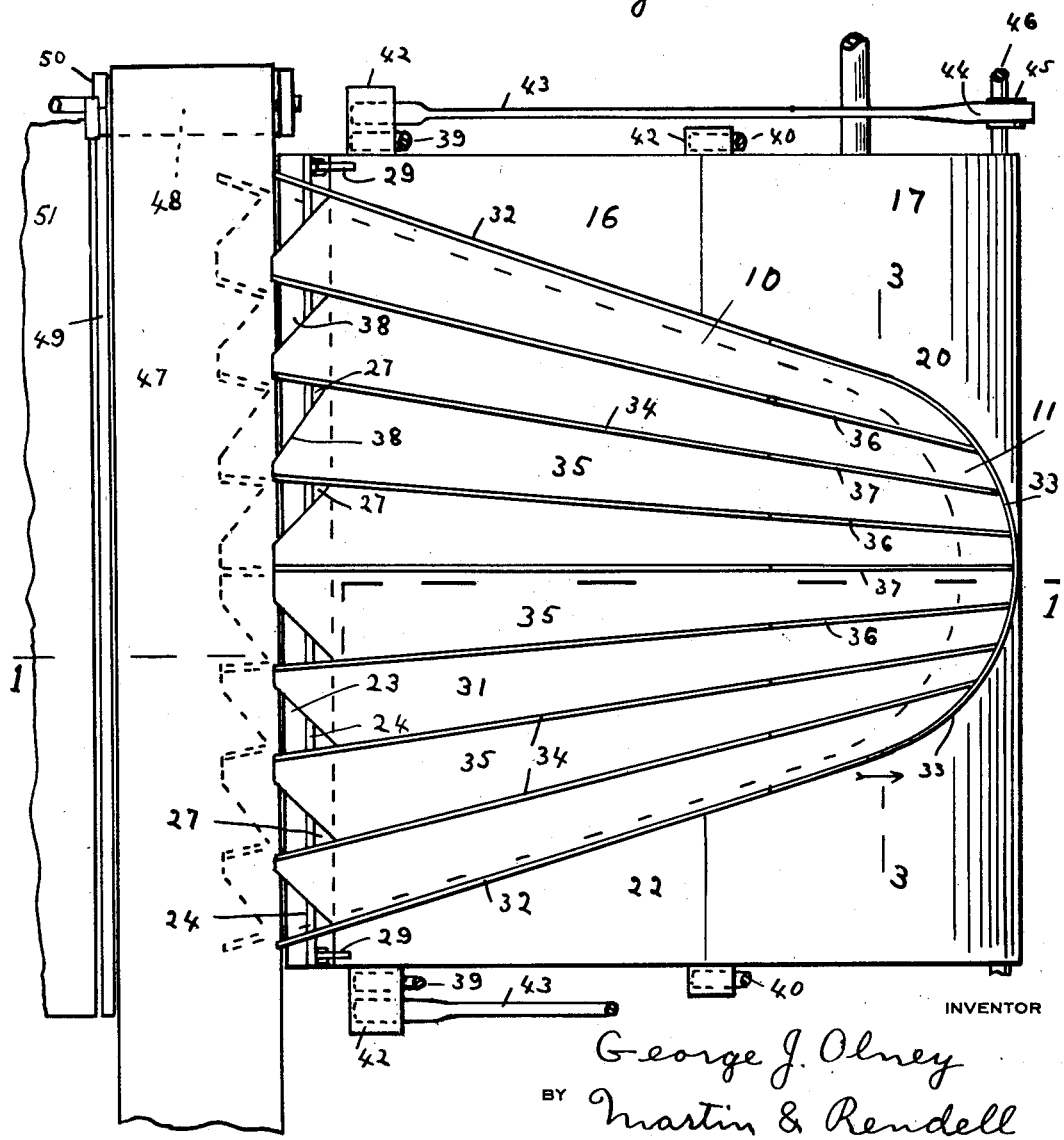

Patented June 12, 1934

1,962,668

UNITED STATES PATENT OFFICE 1,962,668

STRING BEAN CLEANER

George J. Olney, Westernville, N. Y.

Application September 24, 1931, Serial No. 564,894

4 Claims. (Cl. 209—136)

This invention relates to string bean cleaners of the type where the string beans are allowed to fall through a current of air which blows away from the good beans the leaves and other light foreign matter and also fine dust or dirt.

The purpose of this invention is to provide a new and improved string bean cleaner of the type described and to provide in combination with such a machine means for spreading out the beans over a considerable area or line by the time they are subjected to the air current and to distribute the falling beans over a considerable area not only transversely of the end of the chute delivering the beans to the current of air but to some extent also longitudinally of the chute and to have the said delivery chute specially formed and constructed to so separate the beans both longitudinally and transversely of the chute, to have means at the upper part of the chute to assist in a preliminary division of the incoming supply of beans into the channels provided between the upstanding partitions upon said chute.

Further purposes are to provide a new and improved form of air duct and outlets therefrom so that the falling beans may be subjected to two successive blasts or currents of air and to have convenient and accurate means for varying the amount and force of the air current at the outlets from the air duct.

Further purposes and advantages of the machine will appear from the specification and claims herein.

Fig. 2 is a horizontal sectional view of said machine on line 2—2 of Fig. 1.

Figure 3:
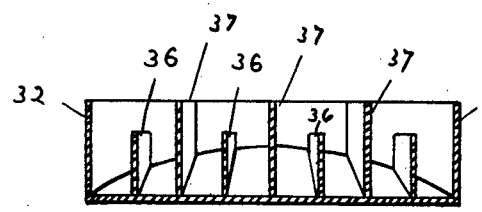
Fig. 3 is a vertical sectional view on line 3—3 of Fig. 2.

Referring to the drawings in a more particular description it will be seen that the string bean cleaner comprises a vibratingly or reciprocatingly mounted slanting delivery chute 10 the upper end of which forms the hopper 11 to receive the supply of incoming beans and that the beans falling from the lower end of the chute are subjected to an upper and a lower air current 12 and 13 respectively delivered from upper and lower outlets 14 and 15 respectively of air duct 16 which is supplied with the required quantity of air at sufficient velocity or force as from a blower 17.

The blower 17 may conveniently be formed in the usual way of an air blower namely having a power driven fan 18 with outwardly extending blades 19 enclosed within a circular or cylindrical casing 20 with said casing delivering the air tangentially from the blower into the air duct 16. This air duct is in the form of a longitudinal casing having opposite sides 21, top 22 and bottom 23 and with these parts so proportioned that the air duct will have a transverse width at least as wide as the lower or delivery end of the vibrating chute 10 and with the air duct of sufficient height to allow the required volume of air to pass therethrough and also to provide facility for the separating of the outgoing air into the said upper and lower air currents 12 and 13.

Figure 1:
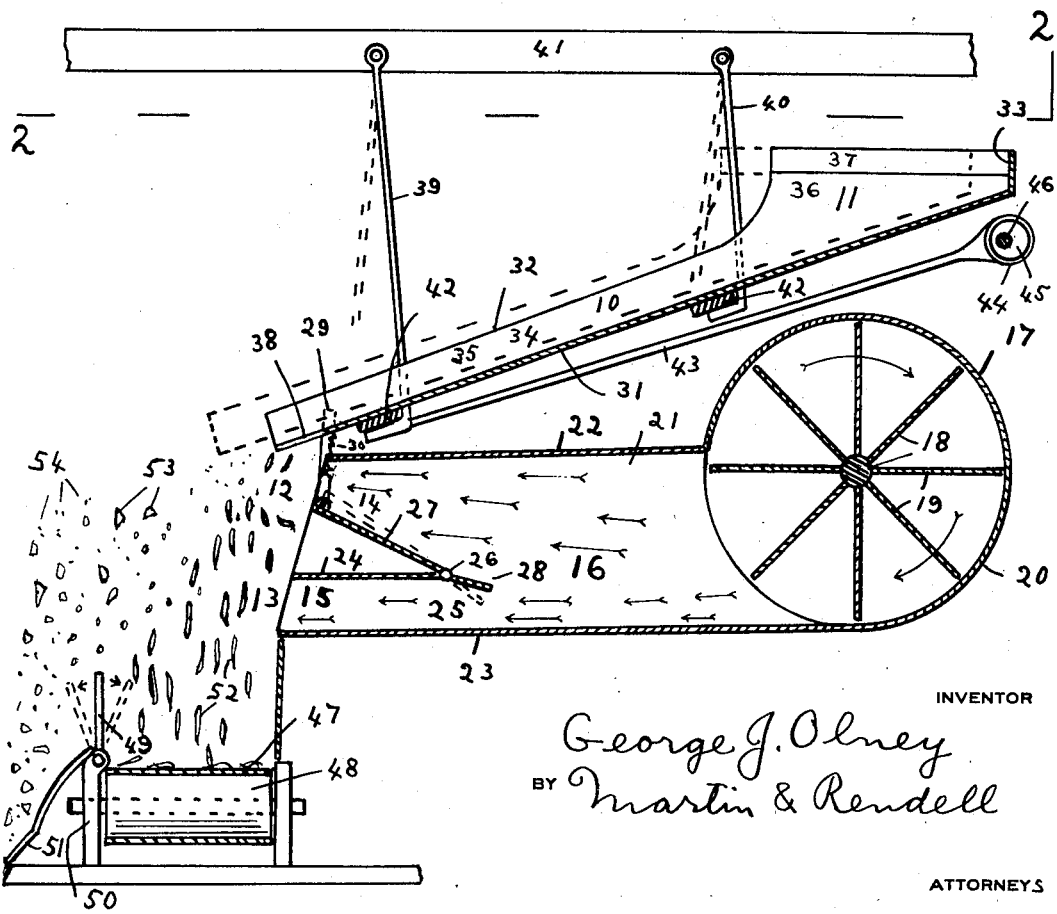
Fig. 1 is a longitudinal vertical sectional view through a string bean cleaner embodying this invention.

This separation of the outgoing air into two currents is conveniently accomplished by providing a stationary horizontal panel 24 extending from the outer or left hand end (as the parts are seen in Figs. 1 and 2) of the air duct back into the air duct a sufficient distance and on a level spaced upward from the bottom 23 of the air duct so as to provide a straight passage 25 for air to pass to the lower outlet 15. At the inner or right hand end of this stationary panel there is hinged on axis 26 an adjustable panel 27. Most of the length of this adjustable panel is to the left of said axis in that said panel extends to the delivery end of said air duct; that is to the outer line of the upper air outlet 14 but a part as 28 of said panel 27 extends to the right from the axis 26 for the purpose hereinafter to be described. The main portion of the panel 27 being the part to the left of the axis 26 as well as the inward end 28 have a width as close to the inside width of the air duct as may be and yet permit said panel 27 to be readily adjusted in the air duct.

This adjustable panel 27 is held at desired angle by means of links 29 pivoted at their lower ends to the opposite outer corners of said panel 27 and having in their upstanding ends notches 30 to engage the outer end of the top 22 of the air duct. It will be seen that as the outer end of said adjustable panel is raised the height of the upper air outlet 14 thereabove will be decreased and thus the velocity of the air current 12 issuing therefrom will be increased. This increase of velocity will be further emphasized by the fact that the portion 28 of the panel to the right of the axis 26 will begin to swing downwardly in front of the right hand end of the passage 25 leading to the lower air outlet as the outer end of the panel 27 is raised. It will thus be seen that raising the left hand end of the adjustable panel will cause the descending inner lower end 28 of said panel to deflect upwardly an increasing amount of air that would otherwise go to the lower air passage and thus increase the velocity and also volume of air issuing from the upper air outlet 14. By proper original location of the stationary panel relative to the height of the air duct, and by proper adjustment of the movable panel 27 a great variety of sorting effects upon the beans may be had according to different conditions as for instance the size and weight and maturity of the beans to be sorted.

The vibrating chute 10 as plainly seen in Fig. 2 is fan-shaped in general outline and consists of a bottom 31 conveniently formed of sheet metal of the required size and strength. The sides of the large piece of sheet metal used for the bottom may be conveniently turned up to form two opposite sides 32 connected by a circular or rounding top wall 33 at the upper right hand end of the chute. Upstanding partitions 34 are provided in the chute extending from the upper right hand end to the lower left hand end of the chute and spreading out as they extend to the delivery end of the chute. The upper or right hand third or thereabouts of the chute forms the feed hopper 11 into which the incoming supply or line of string beans to be sorted is delivered. In order to help in the original distribution of the beans into the channels 35 between the partitions 34 the partitions in the hopper portion of the chute are extended upwardly above the height of the partitions through the body of the chute. These raised portions are alternately high and low. This is clearly shown in the cross sectional view, Fig. 3, which indicates that counting from the left, the first, third, fifth and seventh high portions or extensions 36 are not so high as the intervening second, fourth and sixth extensions 37. This alternate arrangement of high and low extensions 37 and 36 prevents the beans from resting flat across the top of the said extensions as practically none of the beans can reach from one high extension to another high extension and accordingly the beans are directed to the right or left of the high partitions into one channel or another.

It will be obvious from an inspection of Fig. 2 that the beans supplied to the chute are not only well scattered at the beginning by falling into the different channels 35, but that these channels due to the fan-shaped form of the chute 34 and the radiating or diverging arrangment of the upstanding partitions 34 cause the beans being handled to be spread out over a much greater area transversely of the chute as they come to the lower or delivery end of the chute. I have found, however, that it is desirable to deliver the string beans over a considerable area not only transversely of the chute, but lengthwise of the chute. In this way the beans are scattered just that much more through the air currents to which they are to be subjected and allow the air to have more chance to separate leaves and parts of stalks and other light foreign matter from the string beans themselves and also so as to subject more of the area of the beans to the air current. The means I provide for thus making an irregular and extended delivery of the beans lengthwise of the chute consists in providing or cutting V-shaped notches 38 in the bottom 31 of the chute at its delivery end. Preferably such V-shaped notch is provided in each channel 35 and also preferably this V-shaped notch will have its greatest depth away from the partition 34; that is nearer the central partition 34. The slant of the chute tends to make the beans come to the side of the channel that is nearer the central partition 35. This tendency is somewhat overcome by the vibration or reciprocation to which the feed chute is subjected. Accordingly the beans that have come down at the inner side of each channel, that is towards the central partition of the chute, will thus be carried farther to the left before they leave the chute. The beans and other material that has become more spread out through the channel will come to the notches 38 and be allowed to drop without being carried so far longitudinally of the chute.

The chute 10 is so mounted as to be capable of reciprocating or vibrating and means are provided for imparting a rapid vibrating or reciprocating motion to said chute. Convenient means for so mounting and moving the chute consists of having the chute suspended by four spring hangers in two pairs, one long hanger 39 at each side of the chute near its lower end and one shorter hanger 40 at each side of the chute a little more than half way up. These hangers may conveniently be formed of spring or resilient material having their upper ends suitably fastened to top frame member 41. The lower ends of these hangers are secured to the outwardly projecting ends of cross cleats 42 extending transversely of the bottom surface of the chute. This method of suspension allows for the required vibrating or reciprocating motion of the chute. A convenient form of imparting the vibrating motion to the chute consists of a rod 43 having its lower end secured to the lower cross piece 42 and with the upper end of said rod connected to the eccentric collar 44 mounted upon an eccentric 45 on a power-driven shaft 46.

As will be seen particularly by reference to Figs. 1 and 2 there is provided below the chute 10 and lower outlet 15 suitable means for receiving the good string beans 52 which on account of their weight drop within a short distance of the outer end of the chute and air passages 14 and 15. The means for so receiving the beans is shown on the drawings as the upper length of a belt 47 which being mounted upon rollers 48 forms an endless conveyor for transferring these string beans to the desired place or to a convenient large receptacle. Beyond the belt 47 there is provided a convenient receptacle or bin 51 for receiving the lighter matter separated from the string beans by the successive air currents. As will be seen from Fig. 1 the course of these foreign matters such as parts of leaves or stems 53 and dirt or dust 54 are blown by the upper and lower air currents 12 and 13 out from the falling string beans beyond the line of the belt 47 into the bin 51. In Figs. 1 and 2 only the nearer edge of this bin or other receptacle is shown.

Preferably there is also provided on the farther outer side of the belt 47 an upstanding adjustable guide 49. This may be conveniently pivoted in two outer supports 50 carrying the rollers 48. This guide 49 is adjustable, that is it is adapted to swing towards the air chute 16 or away therefrom more or less to the two dotted line positions of the guide as seen in Fig. 1. This adjustable guide enables the machine to be readily adapted to different situations. For instance, if the string beans and other material are both very heavy as by being wet the string beans will not be carried out so far over the belt and similarly the lighter material as leaves 53 and small particles of dirt 54 will be proportionately heavier and so would not be blown beyond the directly upright position of the guide 49. Under such circumstances the guide 49 will be turned more or less to the right hand dotted position so as to have the leaves and other foreign matter drop to the left hand side of said guide while still allowing all of the beans to drop to the right of this guide. If any particular run of beans was light such as either being dry, small or immature, the guide 47 would be swung farther to the left so as to still hold all of the string beans on the belt side of said guide.

In Figs. 1 and 2 the reciprocating chute 10 is shown in full lines in its re-tracted position, that is when swung farthest to the right or farthest back over the air duct 16. In dotted lines in both of these views is shown the outline of the said chute when it has been advanced farthest to the left, that is farthest over the belt 47. It will be understood of course that the conveyor is constantly shifting between these two positions so that the supply of beans and other materials projected over the lower edge of the conveyor is constantly shifting within the range indicated from just over the near edge of the belt to a position well towards the center of the belt. It will be seen further, however, that the notches 38 re-entering into the discharge end of each passage 35 still further irregularly drop the beans and other materials therewith at different points longitudinally of the air current and longitudinally of the chute 10. For instance, in the full line position the beans and other material that have followed the side of the channel nearer towards the central partition and so along the side of the passage to which the notch does not reach, will be carried farther over the belt than would be a bean that has moved by the reciprocation of the chute so as to come to any portion of the notch. It will be obvious that a bean dropping over the portion of the notch where the notch is deepest will fall into the air current 12 much nearer the air duct 16. As there is a notch for each of the passages 35 and a considerable extent to the angle of the notches, it will be seen that the beans and other material are by my device constantly spread out through a relatively wide zone relative to the length of the air current and furthermore that this zone is constantly changing back and forth lengthwise of the air current.

The purpose and operation of the two superposed air currents 12 and 13 is to get a more thorough and more wide-spread blowing action of the air currents vertically of the falling beans and other materials. By getting two spaced air currents an opportunity is given the material to separate or come into a position to separate by the time it reaches the lower air current. The benefit of this successive superposed air current effect is further increased by being able to vary as needed the force of the two air currents. For instance the upper air current may be set so as to deliver much less air than the lower current. This lesser upper air current will then separate materials that are only lightly in contact with the beans while the lower air current by being stronger gives a final separation by blowing from the beans leaves or other light material that might have been more strongly attached to the beans and so have remained in contact notwithstanding the upper air current.

What I claim as new and desire to secure by Letters Patent is:

1. In a string bean cleaner, the combination of a vibrating chute slantingly arranged and adapted to discharge the beans from its lower end, the lower edge of the chute having open-ended, slanting notches extending back from the lower edge whereby the beans are spread out longitudinally of the chute when they fall therefrom and means for delivering a current of air through the falling beans to blow the lighter materials therefrom.

2. In a string bean cleaner, the combination of a vibrating chute slantingly arranged and adapted to discharge the beans from its lower end, upstanding partitions in said chute diverging as they descend whereby the beans and lighter materials therewith are spread out transversely of the chute when they fall from the chute, the lower edge of the chute having open-ended, slanting notches extending back from the lower edge whereby the beans are spread out longitudinally of the chute when they fall therefrom and means for delivering a current of air through the falling beans to blow the lighter materials therefrom.

3. In a string bean cleaner, the combination of a vibrating chute slantingly arranged and adapted to discharge the beans from its lower end, upstanding partitions in said chute diverging as they descend, whereby the beans and lighter materials therewith are spread out transversely of the chute when they fall from the chute, the partitions at the receiving end of the chute being alternately high and low with the high partitions spaced farther apart than the length of the string beans, and means for delivering a current of air through the falling beans to blow the lighter materials therefrom.

4. In a string bean cleaner, the combination of an air duct having a wide lateral outlet, means for supplying a current of air to said air duct, a vibrating fan-shaped chute slanting downwardly with its lower end above and near the outlet of the air duct and upstanding partitions in the chute diverging as they extend downwardly along the chute, said partitions being alternately high and low at the receiving end of the chute with the high partitions spaced farther apart than the length of the string beans to initially distribute the beans and lighter material into the passageways between said partitions.

GEORGE J. OLNEY.